AMPLIFIER EMPLOYING MICROWAVE RESONANT SUBSTANCE

Filed Dec. 1, 1954 4 Sheets-Sheet 1

INVENTOR.
ROBERT H. DICKE
BY J. C. Whittaker
ATTORNEY.

Sept. 11, 1956 R. H. DICKE 2,762,871

AMPLIFIER EMPLOYING MICROWAVE RESONANT SUBSTANCE

Filed Dec. 1, 1954 4 Sheets-Sheet 2

INVENTOR.
ROBERT H. DICKE
BY J. C. Whittaker
ATTORNEY

AMPLIFIER EMPLOYING MICROWAVE RESONANT SUBSTANCE

Filed Dec. 1, 1954 4 Sheets-Sheet 3

INVENTOR.
ROBERT H. DICKE
BY J. L. Whittaker
ATTORNEY

AMPLIFIER EMPLOYING MICROWAVE RESONANT SUBSTANCE

Filed Dec. 1, 1954 4 Sheets-Sheet 4

INVENTOR.
ROBERT H. DICKE
BY
J. L. Whittaker
ATTORNEY

United States Patent Office 2,762,871
Patented Sept. 11, 1956

2,762,871

AMPLIFIER EMPLOYING MICROWAVE RESONANT SUBSTANCE

Robert H. Dicke, Princeton, N. J.

Application December 1, 1954, Serial No. 472,430

28 Claims. (Cl. 179—171)

This invention relates generally to microwave amplifiers and particularly to an improved microwave amplifier which employs a microwave resonant substance as the amplifying element.

An object of the present invention is to provide an improved microwave amplifier.

Another object of the invention is to provide improved methods and means for utilizing the resonance properties of particles for amplifying microwave energy.

Another object of the invention is to provide an improved microwave amplifier capable of efficient operation in or near the millimeter wave region.

Another object of the invention is to provide improved methods and means for utilizing substances having particles or molecules not in thermal equilibrium for amplifying microwave energy.

A further object of the invention is to provide a novel microwave amplifier having an improved noise figure.

A further object of the invention is to adapt the principles of microwave spectroscopy to the amplification of microwave energy.

A still further object of the invention is to provide an improved microwave amplifier employing a microwave resonant substance as the amplifying element.

A still further object of the invention is to apply microwave energy to a microwave resonant substance to disturb the thermal equilibrium condition of the substance and to utilize the substance in the disturbed condition for the amplification of microwave energy.

Another object of the invention is to provide an improved resonant structure in the form of a waveguide loop within which a running wave is propagated.

The foregoing and other objects and advantages of the invention are achieved in the following manner. Initially the particles of a substance, for example, the particles of a resonant solid or liquid or the molecules of a confined body of microwave resonant gas, assume a population distribution in various discrete quantum energy states defining a positive temperature, such as room temperature (+300° Kelvin). With such a population distribution the lower energy particle states are populated more densely than the higher energy states, the particles are in a condition of thermal equilibrium, and microwave radiation incident on the particles is absorbed. This is a condition for which the particles or gas molecules present "positive" attenuation to microwave energy incident thereon at a resonance frequency of the substance.

Microwave excitation energy is then applied to the substance or body of gas, the excitation energy being of sufficient strength to effect an inversion in the population distribution of the particle energy states. The inversion may be caused to take place either by applying a burst of microwave energy to the substance at the same frequency as the microwave energy to be amplified or by applying to the substance a combination of a C. W. microwave field at a different frequency and a perturbing field such as a Stark field. With the inversion effected fairly quickly the thermal equilibrium condition is disturbed and the energy states have population distributions defining a negative temperature (−300° Kelvin). With the population distributions inverted the particles or molecules emit rather than absorb microwave energy at the resonance frequency. Under this condition the particles or molecules may be said to present "negative" attenuation to microwave energy. Since the inverted population distribution condition is an unstable one the particles or molecules finally "relax" and return to thermal equilibrium, i. e., the condition defining a positive temperature.

A collision broadened 3—3 ammonia gas spectral line has a line center absorption coefficient of $7.2\times10^{-4}$ cm.$^{-1}$. Absorption coefficients for other ammonia spectral lines are given by Gordy in "Reviews of Modern Physics," vol. 20, No. 4, page 692 (October 1948). After the particle state inversion, the line center absorption coefficient of the 3—3 ammonia line is $-7.2\times10^{-4}$ cm.$^{-1}$. Since waveguide and cavity resonator components conveniently may be made which have absorption coefficients less than $7.2\times10^{-4}$ cm.$^{-1}$, the net absorption of the gas contained therein is negative. This means the input signals incident on the body of gas are "negatively attenuated" or amplified rather than absorbed during the interval in which the gas molecules are not in thermal equilibrium, i. e., while the population distribution of the particle energy states are inverted.

The invention will be described in detail with reference to the accompanying drawing in which.

Similar reference characters are applied to similar elements throughout the drawings.

*Amplification theory*

Figures 1, 2, 3, 4:
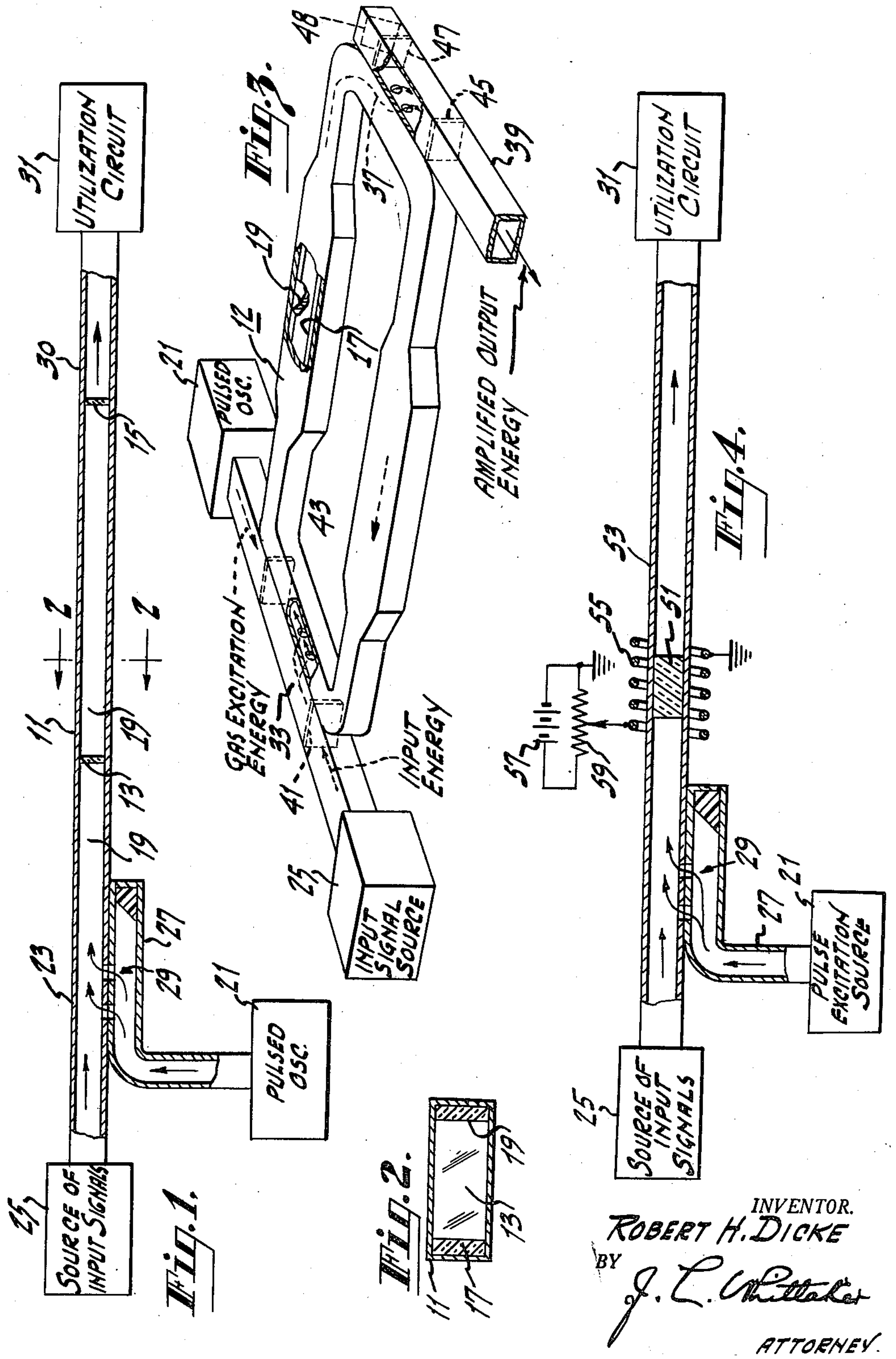
Figure 1 is a schematic diagram, partially in block form, of a first embodiment of the invention in which a waveguide type cell contains a gas capable of exhibiting molecular resonance and pulsed microwave energy is utilized to excite the gas for amplification of input energy.
Figure 2 is a sectional view of the waveguide cell of Figure 1 taken along the section line 2—2.
Figure 3 is an embodiment of the invention in which the amplifying element, a microwave absorptive resonant gas, is contained in a waveguide loop and a running wave is utilized to excite the gas.
Figure 4 is another embodiment of the invention in which a resonant solid is utilized as the amplifying element.

Assume that a microwave resonant substance has at least two energy levels $E_1$ and $E_2, E_1>E_2$, and that transitions occur between these levels. While actually there are many more discrete levels ($E_3$, $E_4$, $E_5$, . . . $E_n$, only levels $E_1$ and $E_2$ will be considered in the present discussion.

For the substance in thermal equilibrium the number of elemental particles $N_1$ in state $E_1$ is $$N_1 \alpha \epsilon^{\frac{-E_1}{kT}} \quad (1)$$

and the number of elemental particles $N_2$ in state $E_2$ is $$N_2 \alpha \epsilon^{\frac{-E_2}{kT}} \quad (2)$$

where T is the absolute temperature in degrees Kelvin, $k$ is Boltzmann's constant, and the proportionality factors in (1) and (2) are the same. For the condition of thermal equilibrium $N_2 > N_1$.

With an electromagnetic field of frequency $$\nu = \frac{E_1 - E_2}{h}$$

applied to the substance the rate of energy emission by particles initially in state $E_1$ (resulting from transitions $E_1 \rightarrow E_2$) is $$\text{Power}_{\text{emitted}} = P_{12} N_1 (E_1 - E_2) = P_{12} N_1 h\nu \quad (3)$$

where $P_{12}$ is the transition probability for transitions $E_1 \rightarrow E_2$, $h$ is Planck's constant, and $h\nu$ is an energy quanta at frequency $\nu$.

The rate of energy absorption by particles initially in state $E_2$ (resulting from transitions $E_2 \rightarrow E_1$) is $$\text{Power}_{\text{absorbed}} = P_{21} N_2 (E_1 - E_2) = P_{21} N_2 h\nu \quad (4)$$

where $P_{21}$ is the transition probability for transitions $E_2 \rightarrow E_1$.

In the equilibrium condition, $$\text{Power}_{\text{absorbed}} - \text{Power}_{\text{emitted}} = P_{12} N_2 \left(\frac{h\nu^2}{kT}\right) kT \quad (5)$$

and $$\frac{h\nu}{kT} \ll 1$$

This is a positive quantity which is characteristic of the particles in the discrete quantum energy states having a population distribution defining a positive temperature and microwave energy incident on the substance is attenuated or absorbed. If $N_1$ were made greater than $N_2$, Equations 1 and 2 would imply a negative temperature and the right side of Equation 5 becomes negative. Under such circumstances the particles are not in thermal equilibrium and microwave energy incident on the substance is amplified, i. e., sees negative attenuation, rather than absorbed.

$N_1$ is made greater than $N_2$ and the quantity in Equation 5 is made negative in accordance with the invention in the following manner. A microwave excitation field of frequency $$\nu = \frac{E_1 - E_2}{h}$$

is applied to the substance of sufficient strength to effect an inversion in the population distribution of the particle energy states. With the inversion effected fairly rapidly, i. e., in a time less than the relaxation time of the particles or molecules, for a short time thereafter the atomic systems do not have sufficient time to re-establish thermal equilibrium among their energy states and the populations of energy states $E_1$ and $E_2$ are characteristic of a negative temperature. During this short interval the higher enery states ($E_1$, for example), are more densely populated than the lower energy states ($E_2$, for example), $N_1 > N_2$, $\text{Power}_{\text{absorbed}} - \text{Power}_{\text{emitted}}$ is negative, and the substance is capable of amplifying input energy applied thereto.

*Amplifier noise figure*

In order to avoid the complexities of determining the noise figure of a cavity resonator containing a resonant substance such as ammonia gas utilized according to the invention, the noise figure for a long waveguide type cell will be discussed. The noise figure of a comparable cavity resonator will be essentially the same.

Let $S_1$ and $S_2$ represent the signal powers entering and leaving an elemental slab of waveguide having length $\Delta l$. $N_1$ and $N_2$ are the corresponding noise powers per unit frequency.

Let $\alpha_g$ and $\alpha_a$ be the absorption coefficients of the empty waveguide and of ammonia in a lossless waveguide, respectively. With the ammonia in its negative temperature state its absorption coefficient is $-\alpha_a$. For the ammonia in this state $$S_2 = (1 + \alpha_a \Delta l)(1 - \alpha_g \Delta l) S_1 = [1 + (\alpha_a - \alpha_g)\Delta l] S_1 \quad (6)$$

and $$N_2 = (\alpha_a + \alpha_g)\Delta l kT + N_1 [1 + (\alpha_a - \alpha_g)\Delta l] \quad (7)$$

Note in Equation 7 that in addition to the incoming noise power $N_1$ there is noise power added by the ammonia and by the waveguide. Although the ammonia effectively is at temperature $-T$ it generates noise as though its temperature were $+T$.

By summing up Equations 6 and 7, for a series of slabs of length $\Delta l$, the signal and noise powers for a sample of length $l$ is, $$S = S_0 \epsilon^{(\alpha_a - \alpha_g) l} \quad (8)$$

and $$N = N_0 \epsilon^{(\alpha_a - \alpha_g) l} + \frac{\alpha_a + \alpha_g}{\alpha_a - \alpha_g}\left[\epsilon^{(\alpha_a - \alpha_g) l} - 1\right] kT \quad (9)$$

where S and N are the signal and noise powers, respectively, in the waveguide at a distance $l$ from its input end. $S_0$ and $N_0$ are the initial values of signal and noise power, respectively. For a signal generator at temperature T, $N_0 = kT$. Therefore, $$N = kT\left[\epsilon^{(\alpha_a - \alpha_g) l} + \frac{\alpha_a + \alpha_g}{\alpha_a - \alpha_g}\left(\epsilon^{(\alpha_a - \alpha_g) l} - 1\right)\right] \quad (10)$$

The amplifier noise figure ($\overline{NF}$) is the ratio of the input to output signal-to-noise ratios, $$\frac{\frac{S_0}{kT}}{\frac{S}{N}} = NF = \frac{\epsilon^{(\alpha_a - \alpha_g) l} + \frac{\alpha_a + \alpha_g}{\alpha_a - \alpha_g}\left(\epsilon^{(\alpha_a - \alpha_g) l} - 1\right)}{\epsilon^{(\alpha_a - \alpha_g) l}}$$

and is reducible for an amplifier of large gain to $$\overline{NF} = \frac{2\alpha_a}{\alpha_a - \alpha_g} \quad (11)$$

The attenuation constant (or absorption coefficient) for a rectangular silver plated waveguide is given by $$\alpha_g = \frac{2}{377 D \delta} \frac{1}{b} \frac{1 + \frac{2b}{a}\left(\frac{\lambda}{2a}\right)^2}{\sqrt{1 - \left(\frac{\lambda}{2a}\right)^2}} \quad (12)$$

where $a$ and $b$ are the wide and narrow waveguide dimensions, respectively, $\lambda$ is the wavelength of energy travelling through the waveguide, $\delta$ is the electrical conductivity of the plated guide, and D is the skin depth of the waveguide.

If $a = b = \lambda = 1.25$ cm., $\delta = 6.2 \times 10^7$ mhos per meter, $D = 3.9 \times 10^{-7}$ meters, and $\alpha_a = 7.2 \times 10^{-4}$ cm.$^{-1}$ (for the 3—3 ammonia line), then $\alpha_g = 2.6 \times 10^{-4}$ cm.$^{-1}$.

From Equation 11, the noise figure corresponding to this waveguide attenuation is $$\overline{NF} = \frac{2(7 \times 10^{-4})}{7 \times 10^{-4} 2.6 \times 10^{-4}} = 3.1$$

By employing mode damping techniques $\alpha_g$ may be reduced to $$\frac{\alpha_a}{4}$$

for which $\overline{NF}=2.6$.

*Amplifier structure*

Referring to Figure 1, a microwave amplifier includes a rectangular metal waveguide type of cell 11, preferably having silver plated inner surfaces. Gas-tight microwave permeable windows 13 and 15, for example, quartz or mica, bound the ends of the cell and dielectric slabs 17 and 19 (Figure 2) are provided which extend along the side walls of the cell. The dielectric slabs load the cell so that microwave energy propagated therethrough is propagated as plane waves with the free space velocity of light. For K-band operation the inside dimensions of the cell 11 may be 1" x ¼" and the thickness of the dielectric slabs 17 and 19 may be about 0.16" for a dielectric constant of about 2.5. The slab material may comprise any of a number of suitable dielectric materials, for example, polystyrene or polytetrafluoroethylene (the latter being sold commercially under the trade name "Teflon").

The cell 11 contains a gas capable of exhibiting molecular resonance. Such gases include, by way of example, ammonia, carbonyl sulfide, or one of the methyl halides. The cell gas pressure is adjusted to a value not greater than $10^{-2}$ millimeters of Hg and preferably is adjusted to a pressure of the order of $10^{-4}$ millimeters of Hg.

Initially the gas molecules are in thermal equilibrium, $N_2>N_1$, and the attenuation or absorption coefficient of the gas is positive. An excitation source 21, a pulsed oscillator, repetitively produces pulses at frequency $$\nu=\frac{E_1-E_2}{h}$$

having durations of the order of ½ microsecond, the interval between successive pulses being of the order of 15 microseconds. In the present example $$\nu=\frac{E_1-E_2}{h}$$

(assuming ammonia is the chosen microwave absorptive resonant gas) coincides with an absorption line of the gas, say the 3—3 ammonia line which is 23,870.1 megacycles. The bursts of microwave energy at frequency $\nu$ from the pulsed oscillator 21 are introduced into the cell 11 via a section of K-band rectangular hollowpipe waveguide 27, a directional coupler 29, preferably of the two-hole type, and another section of K-band waveguide 23. The strength of the applied electromagnetic field at frequency $\nu$ is made sufficiently great to cause an inversion in the population distributions between energy states $E_1$ and $E_2$. In other words, $N_1$ is made greater than $N_2$. An excitation field having sufficient strength to effect an inversion of the type described above may be of the order of 0.1 volt per centimeter.

With the population distributions of energy states $E_1$ and $E_2$ inverted the thermal equilibrium condition of the gas is disturbed and the net absorption or attenuation of the waveguide and resonant gas is negative. This means that the gas is now capable of amplifying energy at frequency $$\nu=\frac{E_1-E_2}{h}$$

The useful amplifying interval in the arrangement described above is for approximately five microseconds immediately following the energy state inversion. After this time, during the next ten microseconds, the gas molecules relax or return to thermal equilibrium and the amplifier gain falls off rapidly. The cycle then repeats, i. e., the population distributions of the energy states $E_1$ and $E_2$ again are inverted, amplification is afforded for the interval following the next state inversion, and then thermal equilibrium again is established.

Input signals at frequency $\nu$ may be applied to the cell 11 for amplification during the specified amplifying interval in any convenient manner. For example, a source 25 of input signals may be directly coupled to the gas cell 11 via the waveguide section 23. The amplified output signal energy is coupled from the cell 11 by another section of K-band waveguide 30 and may be applied to any desired utilization circuit 31. The amount of power which may be derived at the output end of the gas cell 11 is limited by the saturation characteristic of the resonant gas employed and the amount of amplification provided by the gas is determined by the length of the gas path through which the input microwave energy is propagated.

In Figure 3 an embodiment of the invention is shown in which running waves are set up within a loop-type waveguide cell 12. The running waves excite the gas molecules and invert the energy states $E_1$ and $E_2$ for the amplification of input energy. The cell 12 comprises a loop of rectangular waveguide and contains a microwave resonant gas. The cell 12 also contains dielectric slabs 17 and 19 for loading the cell to propagate energy therein at the free space velocity of light. Energy is introduced into the cell 12 by means of an input section of rectangular waveguide 33 and an associated directional coupler 35 while output energy is withdrawn from the cell by means of a different directional coupler 37 and an output waveguide section 39. The input and output waveguide sections 33 and 39 each include a pair of spaced microwave permeable windows 41, 43, and 45, 47, respectively, located on opposite sides of each directional coupler 35, 37. With the windows thus arranged the cell 12 is made gas-tight yet permeable to microwave energy.

Except for losses in the cell 12 or amplification of input energy all the microwave energy entering the cell from the excitation source 21 leaves the cell 12 via the directional coupler 37 and is absorbed in a matched termination 48 at one end of an output waveguide section 39. Similarly all the energy introduced into the cell 12 by the input signal source 25 leaves the cell via the directional coupler 37 and is propagated through the output waveguide section 39 in the opposite direction. In order to achieve this result the total path length of the waveguide loop should be nearly an integral multiple of wavelengths long at frequency $\nu$, the chosen resonance frequency of the gas, and the directional couplers 35, 37 should differ in their coupling coefficients with the coupling coefficient of coupler 37 being the larger. The coupling coefficient of coupler 37 should be adjusted to give the amplifier the desired gain without becoming unstable. The coupling coefficient of coupler 35 should be so fixed that the input energy enters the resonant structure via coupler 35 without any large part of the input energy bypassing coupler 35 to enter the pulsed oscillator 21.

Initially the molecules of the confined body of gas are in thermal equilibrium. An excitation source 21 comprising a pulsed oscillator produces pulses of microwave gas excitation energy at frequency $\nu$. The microwave pulses are coupled in one direction through the input waveguide section 33, through the directional coupler 35, and into the cell 12. The directional coupler 35 transfers energy from the waveguide 33 into the cell 12 so that the transferred energy is propagated around the loop in only one direction, for example, counter-clockwise. Each applied microwave excitation pulse sets up running waves for the period of the pulse which travel around and around the loop and disturb the condition of thermal equilibrium. The excitation energy leaving the cell 12 is absorbed by a matched termination 48 spaced from the waveguide window 47. Since the loop path length is made an integral multiple of wavelengths long at frequency $\nu$ constructive interference occurs between the running waves and the cell 12 effectively acts as a cavity resonator. Immediately after and in response to the application of each microwave pulse, the population distributions of states $E_1$ and $E_2$ are inverted, the gas and cell 12 exhibit a net negative absorption or attenuation, and for a predetermined time thereafter amplification of input energy at frequency $\nu$ is afforded.

The input energy to be amplified is coupled from a source 25 to the cell 12 by the input waveguide section 33. In this instance the input energy is propagated along waveguide 33 in a direction opposite to the direction of propagation of the gas excitation energy and is directionally coupled into the cell 12 by the coupler 35. The input energy is propagated around the loop in a clockwise direction. Since the cell and gas exhibit a net negative attenuation the input energy is amplified and output energy is coupled by coupler 37 into the output waveguide 39 and propagated therein.

The principal reason for applying the gas excitation energy and the input signal energy to the loop so that the corresponding running waves travel therein in opposite directions is to prevent extraneous radiation or "ringing" from the gas molecules appearing in the amplifier output.

Figure 4 shows another embodiment of the invention in which a resonant solid rather than a body of gas is employed as the amplifying element. In this instance a paramagnetic organic free radical material 51, such as alpha-alpha-diphenyl-hydrazine, is disposed within a length of non-magnetic rectangular hollowpipe waveguide 53. A magnetic field is impressed on the material 51 by any convenient means such as by a coil 55 disposed about the guide 53. The coil 55 is supplied with current by a battery 57 and potentiometer 59, or other suitable D.-C. source. With the material 51 subjected to a magnetic field having a flux density of 3000 gausses, alpha-alpha-diphenyl-hydrazine exhibits a resonance at a frequency of the order of $10^{10}$ cycles per second. Under such conditions, while the atomic systems of the material are in thermal equilibrium, microwave energy propagated in waveguide 53 is selectively absorbed. However, a microwave pulse excitation source 21 supplies pulses at the resonance frequency which are directionally coupled to the waveguide 53 to invert the population distributions of the energy states for this particular resonance frequency. After such inversion, while the atomic systems of the material 51 are not in thermal equilibrium, input signals from source 25 are coupled into waveguide 53, see negative attenuation, and are amplified. The amplified input energy at the resonance frequency then is coupled to a load device or other utilization circuit 31. In the event that amplification of energy at some different frequency is desired such amplification may be achieved simply by varying the flux density of the impressed magnetic field to tune the amplifier to different resonance frequency. For example, the specific material mentioned above is capable of exhibiting another resonance at $10^{11}$ cycles per second. The strength of magnetic field required for this resonance is 30,000 gausses. With the field adjusted to this value input energy at $10^{11}$ cycles per second may be amplified.

The principal advantages gained by employing a resonant solid as an amplifying element in the manner described above are (1) high amplifier gain is provided for short lengths of resonant material, (2) the amplifier is tunable merely by suitably adjusting the magnetic field flux density, and (3) the amplifier does not saturate at high power levels as may occur when a gas at low pressure is employed as the amplifying element.

Figure 5:
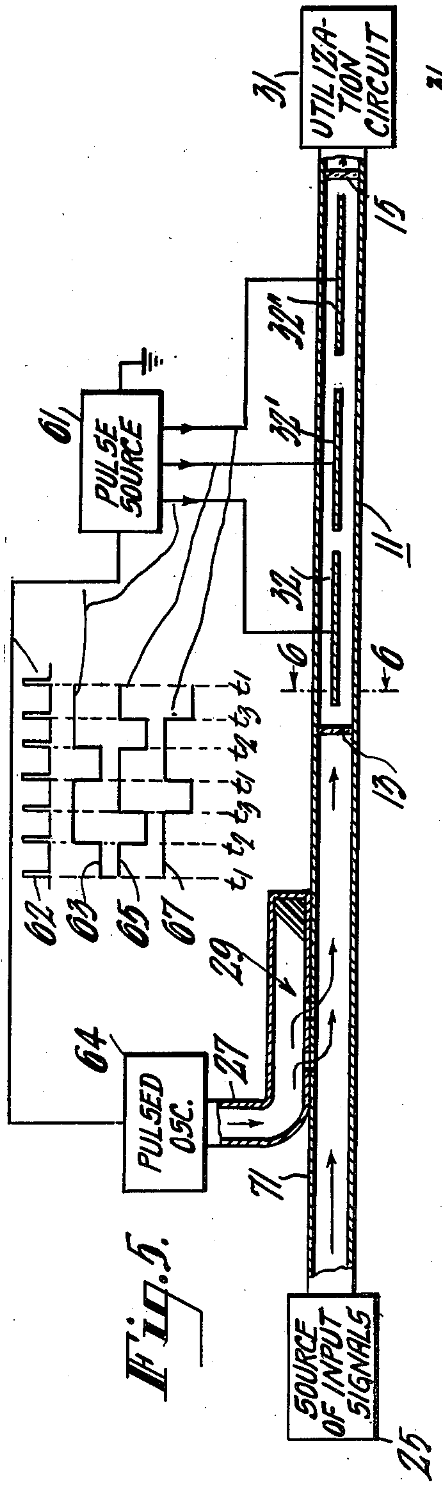
Figure 5 is an embodiment of the invention effectively employing a plurality of amplifiers, one of which always is active.
Figure 6:
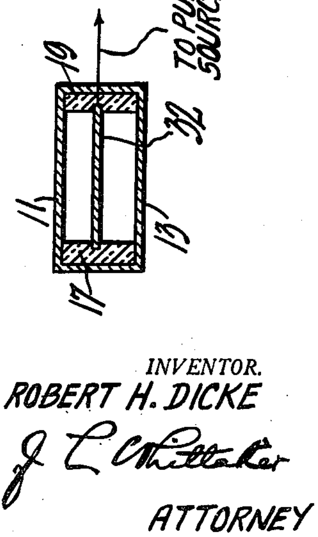
Figure 6 is a sectional view of the waveguide cell of Figure 5 taken along section line 6—6.

Figure 5 shows a further embodiment of the invention in which the amplifier structure employs a microwave resonant gas and continuously is active for amplifying input energy rather than being active for only the relaxation time of the gas molecules. The gas cell 11 again is of the waveguide type and is dielectrically loaded by slabs 17 and 19 (Figure 6). The cell 11 contains a plurality of flat rectangular Stark electrodes 32, 32', and 32'' spaced along the axis of the cell. Each Stark electrode is arranged so that it is parallel to the broad walls of the cell 11. The electrodes 32, 32', and 32'' are insulated from the cell's narrow walls and preferably are supported in position within the cell 11 by insertion into notches formed in the dielectric slabs 17 and 19.

A source 61 of voltage pulses generates four different wave trains 62, 63, 65, and 67. Three of these wave trains 63, 65, and 67 separately are applied to the electrodes 32, 32', and 32'', respectively. Pulse train 63 has zero volts amplitude in the interval $t_1$—$t_2$ and +1000 volts amplitude in the intervals $t_2$—$t_3$ and $t_3$—$t_1$, pulse train 65 zero volts in the interval $t_2$—$t_3$ and +1000 volts in the intervals $t_3$—$t_1$ and $t_1$—$t_2$, and pulse train 67 zero volts in the interval $t_3$—$t_1$ and +1000 volts in intervals $t_1$—$t_2$ and $t_2$—$t_3$. The intervals $t_1$—$t_2$, $t_2$—$t_3$, and $t_3$—$t_1$ each may be approximately five microseconds. Wave train 62 comprises short duration pulses, ½ microsecond or less, for example, occurring at times $t_1$, $t_2$, and $t_3$. The pulse source 61 may be any type source capable of producing wave trains having the amplitude levels and timing illustrated. For example, a source employing the principles set forth in U. S. Patents 2,289,987 and 2,289,988 to L. E. Norton is suitable.

Under the above circumstances, during the interval $t_1$—$t_2$ the gas molecules in the section of the cell 11 in which Stark electrode 32 is located are tuned to frequency $$\nu=\frac{E_1-E_2}{h}$$

and the remaining gas molecules in the cell are detuned with respect to this frequency. During the interval $t_2$—$t_3$ the gas molecules in the second section of the cell 11 are tuned to frequency $\nu$ and the gas molecules in the remaining portions of the cell 11 are detuned. During the interval $t_3$—$t_1$, the gas molecules in the third section of the cell are resonant at frequency $\nu$ and the remaining gas molecules are detuned. Since the pulse trains 63, 65, and 67 applied to the Stark electrodes are utilized only for detuning some of the gas molecules care should be taken that the resulting Stark field per se does not cause an inversion in the population distribution of energy states $E_1$ and $E_2$.

At times $t_1$, $t_2$, and $t_3$, the ½ microsecond pulses of the pulse train 62 key a pulsed oscillaotr 64 to produce a short duration output pulse having frequency $$\nu=\frac{E_1-E_2}{h}$$

for each input pulse. The pulses at frequency $\nu$ may be ½ microsecond or less and are directionally coupled into a section of waveguide 71 and into the gas cell 11 to effect an inversion in the population distributions of energy states $E_1$ and $E_2$. Since at any instant of time the gas molecules in one of the sections of the gas cell 11 are tuned to resonance at frequency $\nu$ and since the population distribution inversion is provided by application to the gas of bursts of the ½ microsecond microwave pulses at frequency $\nu$, the cell 11 always presents a net negative attenuation to input energy at frequency $\nu$. Therefore, input energy coupled from an input source 25 into the cell may be amplified without regard to the timing of the excitation pulse signals and the amplified input energy supplied to utilization circuit 31. The amplifier structure thus continuously is active for amplification of input energy.

Figure 7:
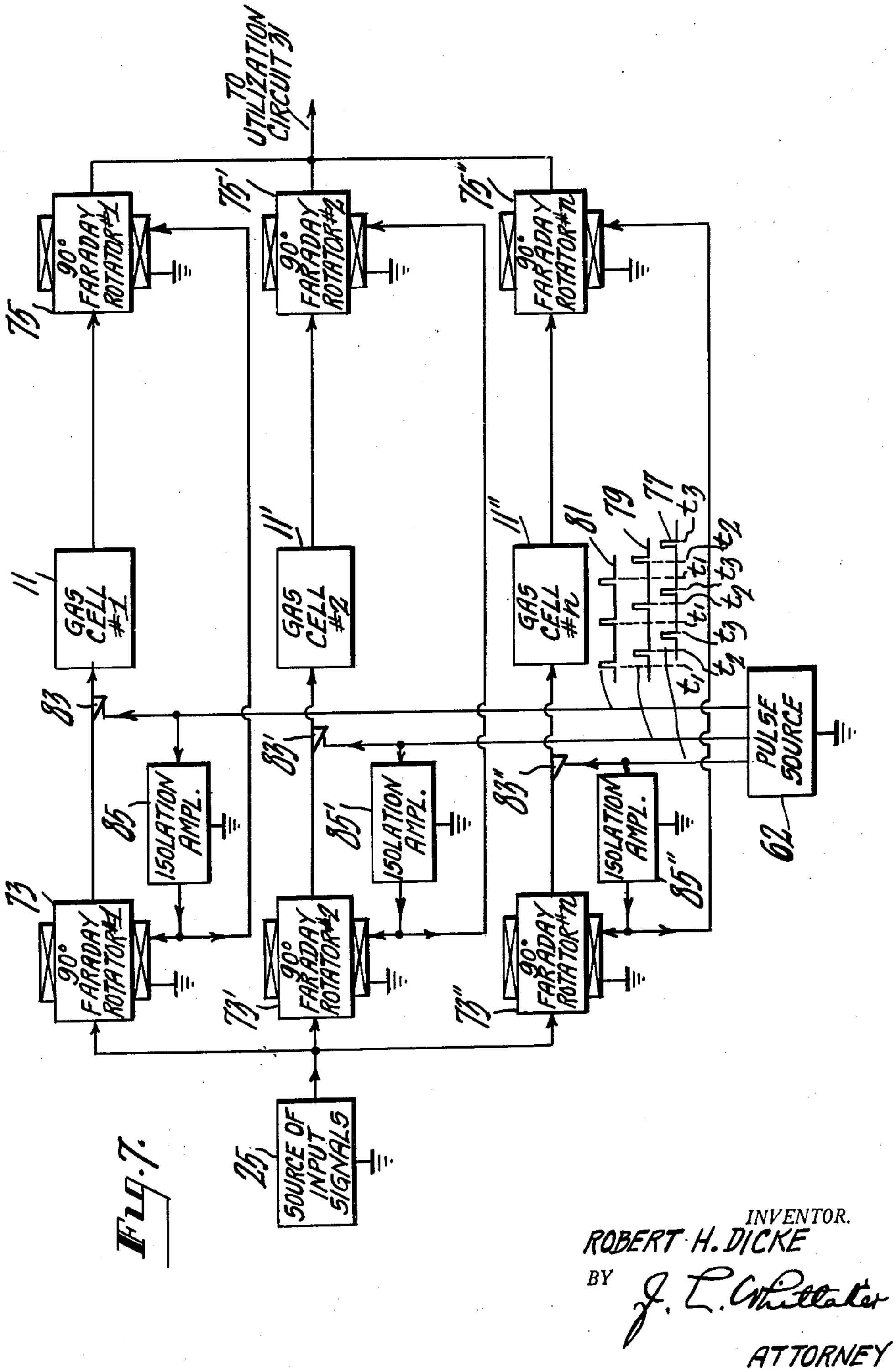
Figure 7 shows another embodiment of the invention in which the amplifier structure continuously is available for amplification of input microwave energy and a plurality of switched amplifier channels are utilized.

In Figure 7 a modification of the structure described with reference to Figures 5 and 6 is shown. In this instance a plurality of gas cells are employed, only one of the cells being electrically coupled at any instant of time to the source of input signals to be amplified. Referring to the drawing, the source of signals to be amplified 25 is coupled to a plurality of amplifier channels (channel #1, channel #2, . . . channel #$n$), each of which channels includes a gas cell 11 of the type described with reference to Figures 1 and 2 and 90° Faraday rotators 73 and 75 connected to the input and output ends of the cell 11, respectively.

The structure and principle of operation of the 90° Faraday rotator are described in detail in volume XXXII, Number 5 of the Bell System Technical Journal (September 1953), pp. 1155–1172 and in Patent No. 2,644,930 granted to C. H. Luhrs et al. on July 7, 1953. Briefly, however, the device comprises an input section of rectangular waveguide, an output section of rectangular waveguide having its axis of symmetry displaced 90° from the axis of symmetry of the input section, and a circular waveguide section interposed between the rectangular input and output sections. The circular waveguide section contains a ferrite cylinder and a solenoid is disposed about the circular section for applying a magnetic field to the ferrite in a direction parallel to the path of transmission of electromagnetic waves through the material.

Consider briefly the operation of the rotator. Microwave energy coupled into the input waveguide section is coupled into the circular waveguide section with no initial change in polarization. In the circular waveguide, with no current supplied to the solenoid, there is no change in polarization as the energy is propagated therethrough. Since the input and output waveguide sections are 90° displaced the input microwave energy does not excite the output waveguide section. However, with a sufficient current supplied to the solenoid the ferrite material rotates the plane of polarization of the input energy 90°. Under such circumstances the energy propagated through the circular waveguide section does excite the rectangular output waveguide section. The 90° Faraday rotator thus comprises a microwave switch which either is "off" or "on" depending on whether or not sufficient current is supplied to the solenoid to rotate the plane of polarization of input microwave energy for the input and output waveguide section to couple together electrically.

Pulse source 62 produces a plurality of pulse trains at frequency $\nu$. Each of the pulse trains has pulses recurring at the same repetition rate, say every 15 microseconds. One of the pulse trains 77 has pulses occurring at time $t_1$, a second pulse train 79 has pulses occurring five microseconds later at time $t_2$, and the third pulse train 81 has pulses occurring at time $t_3$, ten microseconds after the occurrence of pulses in the first train. The pulses occurring at time $t_1$ are applied to the gas cell 11 in channel #1 via a directional coupler 83, each microwave pulse causing an inversion in the population distributions of states $E_1$ and $E_2$. Gas cell 11 in channel #1 then is ready to amplify input energy. The pulses in wave train 77 also are applied to an amplifier 85 which produces at its output a current pulse, substantially rectangular in form, having a pulse duration equivalent to the useful amplifying period of channel #1. In the present example, the pulse duration is five microseconds. The amplitude of the pulse is chosen so that, upon application to the solenoids of rotators 73 and 75, the polarization of input energy from source 25 is roated 90°. Thus the microwave switches in channel #1, i. e., Faraday rotators 73 and 75, are turned on and microwave input energy at frequency $\nu$ may be propagated through channel #1 and amplified in gas cell #1. At time $t_2$ channel #2 is activated for amplification and channels #1 and #$n$ are inactive. At time $t_3$ channel #$n$ is active and channels #1 and #2 are inactive. The instant structure thus affords amplifier structure which continuously is active for amplifying microwave energy. Advantages of this arrangement over the structure described with reference to Figure 6 are that transmission losses through the gas cell structure are reduced and cells may be utilized which do not require Stark electrodes. These advantages are obtained, however, at the expense of employing microwave switches in each amplifier channel. While two such switches are illustrated as employed in each channel it may be desirable to utilize only one switch per channel if absorption losses in the inactive gas cells is not too great.

In the description of the foregoing embodiments of the invention (Figures 1 through 7) in each instance pulses of microwave energy are applied to the resonant substance for inverting the population distributions of the various quantum energy states. If high-Q cavity resonators rather than waveguide type gas cells are employed and are pulse excited "ringing" of both the cavity resonator and the molecules of the resonant substance contained therein may be objectionable. Such ringing is obviated, according to the invention, by the structure shown in Figure 8 wherein the excitation for population distribution inversion occurs at a frequency which differs from the frequency of the signal to be amplified.

Figure 8:
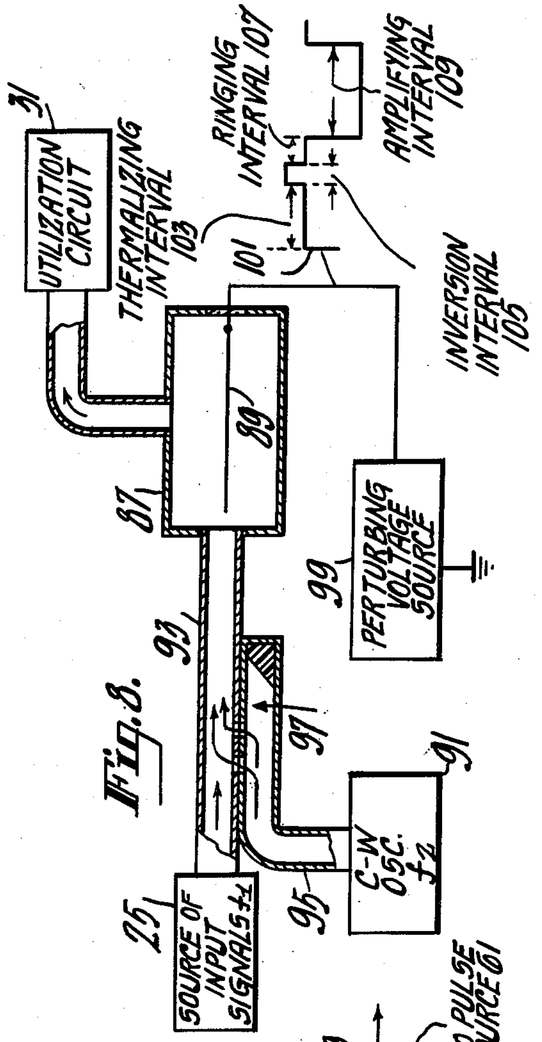
Figure 8 is a further embodiment of a microwave amplifier, according to the invention, in which the resonant substance is excited at a frequency different from that at which amplification is to take place.

Referring to Figure 8, a cavity resonator 87, for example, a cylindrical resonator, is tuned to the frequency of signals to be amplified $f_1$ and contains a microwave absorptive gas at low pressure and a Stark electrode 89. The Stark electrode 89 preferably is positioned midway between the flat walls of the resonator 87 and is insulated from the resonator. A continuous wave excitation source 91 is coupled to the resonator via a section of waveguide 95, a directional coupler 97, and a section of waveguide 93, and couples energy into the resonator at frequency $f_2$. The input signals to be amplified are coupled from the source 25 directly to the resonator 87 by means of waveguide section 93. A perturbing excitation source 99 is coupled to the Stark electrode contained within the resonator 89 and repetitively generates at its output a voltage waveform 101.

In operation, microwave energy at frequency $f_2$ continuously is introduced into the cavity resonator 87. Initially the potential produced by the perturbing excitation source 99 has a sufficient value, for example, +300 volts, to tune the molecules of the resonant body of gas to resonance frequency $f_3$. The waveform is maintained at this voltage level for ten microseconds, during which time the gas molecules reach a condition of thermal equilibrium. At the expiration of the "thermalizing interval" 103 an "inversion interval" 105 follows during which the potential applied to the Stark electrode is increased to +1500 volts. The molecules of the gas are then tuned to gas resonance frequency $f_2$, the frequency of the continuous-wave excitation, and an inversion of the energy states results. After the inversion described above the potential of waveform 101 is brought back to +300 volts and is maintained at this value for one microsecond. This interval is termed the "ringing interval" 107. At the end of this time the potential of the wave 101 is further reduced to zero volts. Application of this potential tunes the gas molecules to resonance frequency $f_1$, the frequency of the energy to be amplified. During this "amplifying interval" 109 the energy states are inverted, the gas molecules are tuned to $f_1$, the gas exhibits negative absorption or attenuation, and input energy is amplified. The useful amplifying interval may be of the order of ten microseconds, after which time the cycle repeats and the perturbing excitation source 99 waveform is returned to the amplitude level for the thermalizing of the gas molecules. In the arrangement described above the Stark field impressed on the gas should be inhomogeneous so that the ringing interval 105 is as short as possible.

Figures 9, 10:
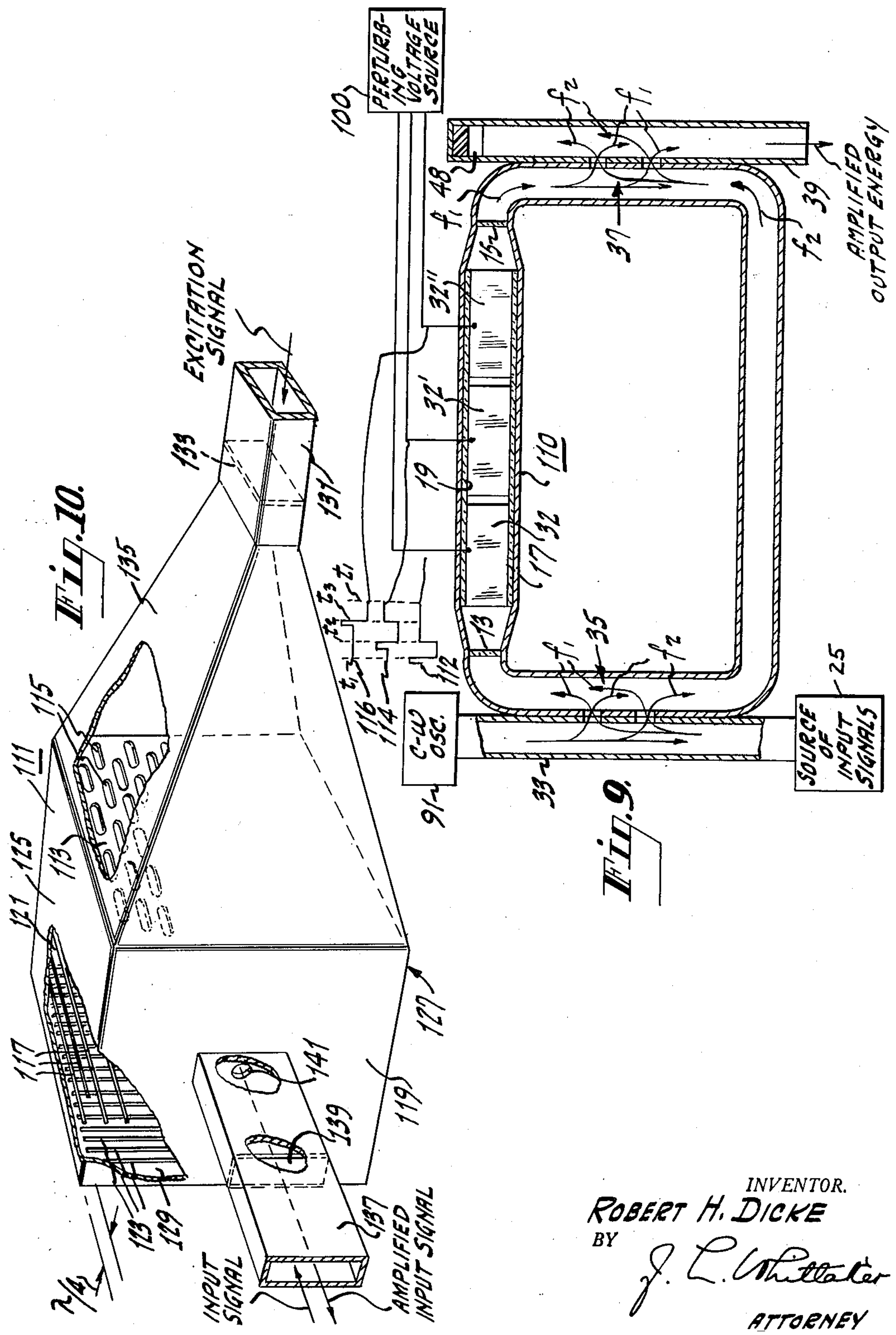
Figure 9 is a plan view, partially in block form and partially in section, of another embodiment of the invention employing a loop type waveguide structure and gas excitation at a frequency different from the frequency at which energy is amplified.
Figure 10 is another embodiment of the invention employing a two-mode cavity resonator with pulsed excitation.

Figure 9 shows another embodiment of the invention which employs a combination of techniques utilized in the structures of Figures 3, 5, and 8. A C. W. oscillator 91 generating energy at frequency $f_2$ and a source 25 of input signals at frequency $f_1$ are coupled to opposite ends of a common waveguide section 33. A waveguide loop, an integral multiple of wavelengths long at frequency $f_1$ is coupled to the waveguide 33 by means of a directional coupler 35. The waveguide loop includes a dielectrically loaded section 110 containing a microwave resonant gas at low pressure. The section 110 is made gas-tight by a pair of microwave permeable windows 13 and 15. The section 110 also includes a plurality of Stark electrodes 32, 32', and 32'' supported therein in the manner described previously with reference to Figures 5 and 6. An output waveguide section 39, terminated at one end by a matched termination 48, is coupled to the loop at a point in the loop outside the section 110 by a second directional coupler 37. The couplers 35 and 37 again should have coupling coefficients as described with reference to Figure 3.

A perturbing voltage source 100 produces voltage waves 112, 114, and 116. These voltage waves are substantially identical in wave shape but are differently timed. The waves 112, 114, and 116 generally are similar to the wave produced by the source 99 of Figure 8 except that the portion of the wave in Figure 8 providing for the ringing interval 107 is omitted as not being essential. The Stark electrodes 32, 32', and 32'' separately are connected to the source 100 so that the potential of electrode 32 is modulated by wave 112, the potential of electrode 32' is modulated by wave 114, and the potential of electrode 32'' is modulated by wave 116.

In operation, C. W. energy generated by the oscillator 91 at frequency $f_2$ is directionally coupled into the waveguide loop and propagated therein only in a counterclockwise direction. Simultaneously, input energy to be amplified from the source 25 at frequency $f_1$ is directionally coupled into the loop and propagated therein only in a clockwise direction. Just prior to time $t_1$ the instantaneous value of the potential of waves 114 and 116 applied to electrodes 32' and 32'', respectively, are such, for example, +300 volts and zero volts, respectively, that gas molecules in the vicinity of electrode 32' are tuned to frequency $f_2$ and are in thermal equilibrium and the gas molecules in the vicinity of electrode 32'' exhibit negative attenuation. However, the instantaneous value of the potential of the wave 112 applied to electrode 32 at this time, +1500 volts, for example, is such that the gas molecules in the vicinity of this electrode 32 are tuned to frequency $f_1$. This causes an inversion in the population distributions of the gas molecules tuned to $f_1$ and this group of molecules exhibits negative attenuation. The molecules tuned to frequency $f_1$ exhibit negative attenuation for an interval $t_1$—$t_2$ (approximately ten microseconds). At $t_1$ and for the interval $t_1$—$t_2$ the potential of the wave 112 is reduced to zero volts and amplification of input energy at frequency $f_1$ takes place. At time $t_1$ the potential of the wave 116 is raised to +300 volts and during the interval $t_1$—$t_2$ is maintained at +300 volts. The potential of wave 114 is maintained at +300 volts until just prior to time $t_2$. Just prior to time $t_2$ the potential of wave 114 is raised to +1500 volts and at time $t_2$ the potential of wave 112 is raised to +300 volts. The raising of the potential of wave 114 to +1500 volts causes the group of gas molecules in the vicinity of electrode 32' to be tuned to frequency $f_1$ and exhibit negative attenuation and amplify input energy at frequency $f_1$. Immediately after this second inversion occurs a time $t_2$ the potential of the wave 114 is reduced to zero volts and maintained at this value for ten microseconds until time $t_3$. The potential of wave 112 is maintained at +300 volts for the interval $t_2$—$t_3$. The potential of wave 116 is maintained at +300 volts until just prior to time $t_3$. Just prior to time $t_3$ the potential of wave 116 is raised to +1500 volts and at time $t_3$ the the potential of wave 114 is raised to +300 volts. The raising of the potential of wave 116 to +1500 volts causes the group of gas molecules in the vicinity of electrode 32' to exhibit negative attenuation and amplify input energy at frequency $f_1$. Immediately after this third inversion occurs, at time $t_3$, the potential of wave 116 is reduced to zero volts and maintained at this value for ten microseconds until time $t_1$. The potential of wave 114 is maintained at +300 volts for the interval $t_3$—$t_1$. Just prior to time $t_1$ the potential of wave 112 again is raised to +1500 volts and at time $t_1$ the potential of wave 116 is raised to +300 volts.

By manipulating the Stark electrode potentials 112, 114, and 116 in the manner described above a different one of three different groups of gas molecules always presents negative attenuation to input microwave energy at frequency $f_1$. The other groups of molecules relax "off-tune" at frequency $f_2$ and are in a thermal equilibrium condition. Since the groups of gas molecules cyclically are tuned to frequency $f_1$ by application of suitable Stark fields to provide negative attenuation and amplification and since one of the groups of gas molecules always presents negative attenuation to incident microwave energy at the input signal frequency continuous amplification of microwaves is afforded.

Figure 10 shows a further embodiment of the invention in which a two-mode cavity resonator 111 is employed. The resonator 111 may be cubic in form, for example, ten centimeters on a side, and contains a gas capable of exhibiting molecular resonance. The front wall 113 of the resonator 111 contains a plurality of rows of slots having their axes aligned horizontally through which vertically polarized input excitation energy may be coupled. The resonator 111 also contains a plurality of vertical rows of horizontal aligned mode damping wires 117, the wires in each row extending between opposed resonator side walls 119 and 121. Each vertical row of horizontally aligned mode damping wires is spaced one-half wavelength at frequency $\nu$ from an adjacent vertical row. The wires 117 may be tungsten wires 1 mil in diameter and each wire in a given row may be spaced 2 mils from an adjacent wire in the same vertical row. For ammonia gas this spacing affords an optical transmission of 70%. The mode damping wires damp all modes of the gas excitation energy except the lowest $TE_{01}$ mode. A single row of vertically aligned absorbing wires 123 is provided which extends between the top and bottom resonator walls 125 and 127, respectively. This row of absorbing wires is spaced one quarter wavelength at the operating frequency from the rear wall 129 of the resonator 111 and the spacing between adjacent vertical wires may be the same as that of the mode damping wires.

In operation, pulsed gas excitation energy at a resonance frequency of the gas is propagated through a section of waveguide 131 containing a gas-tight microwave permeable window 133, through a microwave horn 135, and the slotted resonator wall 113. The electric vector of the excitation energy is perpendicular to the longitudinal axis of the slots 115. The excitation pulse travels through the resonator 111 as a plane wave and causes an inversion in the population distributions of the various quantum energy states before it is absorbed by the row of absorbing wires 123. For a short time after the population distribution inversion the resonator 111 is capable of amplifying input energy. During this interval the energy to be amplified is coupled into the resonator 111 via a section of waveguide 137 containing a gas-tight microwave permeable window 139 and a coupling iris 141. The waveguide section 137 is connected to the resonator side wall 119 and has its axis of symmetry oriented 90° with respect to the waveguide section 131. The electric vector of the microwave energy to be amplified is at right angles to the electric vector of the gas excitation energy. The energy transmitted into the resonator by the waveguide 137 thus is amplified in the resonator and the amplified input energy coupled from the resonator by the same section of waveguide 137 for utilization as desired.

While the operation described above is predicated on the use of a running excitation wave a standing wave may be used with substantially equal facility provided the active amplification interval is short enough, say five microseconds or less.

Also in each of the instances heretofore described where a C. W. oscillator is employed in the amplifier structure it is pointed out that this same C. W. oscillator also may be utilized as the local oscillator for a following mixer stage.

What is claimed is:

1. The method of utilizing a microwave resonant substance normally presenting positive attenuation to electrical energy at frequencies for which said substance is resonant comprising, applying microwave excitation energy to said substance to excite said substance to present negative attenuation to microwave energy at a resonance frequency of said substance, applying microwave input energy to said excited substance at a frequency for which said excited substance presents negative attenuation, and deriving from said substance amplified microwave input energy.

2. The method of utilizing a microwave resonant substance normally presenting positive attenuation to electrical energy at frequencies for which said substance is resonant comprising, applying pulses of microwave excitation energy to said substance at a resonance frequency of said substance to repetitively excite said substance to periodically present negative attenuation to microwave energy at said resonance frequency, applying microwave input energy at said resonance frequency to said substance in intervals during which said substance presents negative attenuation, and deriving from said excited substance amplified microwave input energy.

3. The method of utilizing a microwave substance normally presenting positive attenuation to electrical energy at frequencies for which said substance is resonant comprising, applying continuous-wave microwave excitation energy to said substance at a resonance frequency of said substance to excite said substance to present negative attenuation to microwave energy at said resonance frequency, applying microwave input energy to said excited substance at a frequency different from the frequency of said continuous wave energy, tuning the atomic systems of said excited substance to resonance at said different frequency, and deriving from said excited substance amplified microwave input energy.

4. The method of utilizing a microwave resonant gas normally presenting positive attenuation to electrical energy at frequencies for which said gas is resonant comprising, successively applying pulses of microwave excitation energy to different groups of molecules of a molecularly resonant gas at a resonance frequency of said gas to successively excite said groups of gas molecules whereby at any instant of time at least one of said groups presents negative attenuation to microwave energy at said resonance frequency, applying microwave input energy at said resonance frequency to at least the group of gas molecules instantaneously presenting negative attenuation, and deriving from said groups of gas molecules amplified microwave input energy.

5. A microwave amplifier comprising, a microwave resonant substance normally presenting positive attenuation to electrical energy at frequencies for which said substance is resonant, a source of microwave excitation energy at a resonance frequency of said substance, means for applying said excitation energy to said resonant substance to excite said substance to present negative attenuation at a resonance frequency of said substance, connection means for a source of microwave input energy having a frequency at which said excited substance presents negative attenuation, and means for deriving amplified microwave input energy from said substance.

6. A microwave amplifier as claimed in claim 5, wherein said resonant substance comprises a body of microwave resonant gas confined at low pressure in a gas-tight chamber, said gas and said chamber having a net negative attenuation to microwave energy at said resonance frequency when said gas is excited.

7. A microwave amplifier as claimed in claim 5 wherein said resonant substance comprises a resonant solid contained within a hollow wave energy structure, said resonant solid and said hollow structure having a net negative attenuation to microwave energy at said resonance frequency when said resonant solid is excited.

8. A microwave amplifier comprising, a microwave resonant substance normally presenting positive attenuation to electrical energy at frequencies for which said substance is resonant, means for producing microwave excitation pulses at a resonance frequency of said substance, means for applying said microwave excitation pulses to said resonant substance to excite said substance to periodically present negative attenuation to microwave energy at said resonance frequency, means for applying microwave input energy at said resonance frequency to said substance in intervals during which said substance presents negative attenuation, and means for deriving from said excited substance amplified microwave input energy.

9. A microwave amplifier as claimed in claim 8 wherein said substance comprises a molecularly resonant body of gas at low pressure confined in a gas-tight hollow wave energy structure, said gas and said hollow structure having a net negative attenuation to microwave energy at said resonance frequency when said gas is excited.

10. A microwave amplifier as claimed in claim 9, said hollow wave energy structure comprising a section of waveguide.

11. A microwave amplifier as claimed in claim 9, said hollow wave energy structure comprising a cavity resonator.

12. A microwave amplifier as claimed in claim 8 wherein said substance comprises a resonant solid contained within a hollow wave energy structure, said resonant solid and said hollow structure having a net negative attenuation to microwave energy at said resonance frequency when said resonant solid is excited by said excitation pulses.

13. A microwave amplifier as claimed in claim 12 including means for tuning said solid to control the frequency or frequencies at which said solid is resonant.

14. A microwave amplifier as claimed in claim 13, said hollow wave energy structure comprising a section of waveguide.

15. A microwave amplifier comprising, a microwave substance normally presenting positive attenuation to electrical energy at frequencies for which said substance is resonant, a continuous-wave microwave excitation source providing microwave energy at a resonance frequency of said substance, means for applying said continuous-wave excitation to said substance to excite said substance to present negative attenuation to microwave energy at said resonance frequency, means for applying microwave input energy to said substance at a frequency different from the frequency of said continuous-wave excitation, means for tuning the atomic systems of said excited substance to resonance at said different frequency, and means for deriving from said excited substance amplified microwave input energy at said different frequency.

16. A microwave amplifier as claimed in claim 15 wherein said tuning means comprises means for impressing a Stark field on said substance.

17. A microwave amplifier as claimed in claim 15 wherein said substance comprises a molecularly resonant body of gas and said hollow wave energy structure comprises a waveguide loop having a length an integral multiple of wavelengths long at said different frequency.

18. A microwave amplifier as claimed in claim 17 including means for tuning different groups of molecules of said body of gas one group at a time to said different frequency, at least one of said groups being tuned to said different frequency at any instant of time.

19. A microwave amplifier as claimed in claim 18, said tuning means including a plurality of spaced Stark electrodes immersed in said body of gas.

20. A microwave amplifier as claimed in claim 15 wherein said substance comprises a molecularly resonant body of gas at low pressure confined in a gas-tight hollow wave energy structure, said gas and said hollow structure presenting a net negative attenuation to microwave energy at a resonance frequency of said gas when said gas is excited.

21. A microwave amplifier as claimed in claim 20 wherein said hollow structure comprises a cavity resonator resonant at said different frequency.

22. A microwave amplifier as claimed in claim 17, said means for applying said excitation pulses to said gas and said means for applying input microwave energy to said gas being coupled to said waveguide loop so that the excitation energy and input energy are propagated around said loop in opposite directions.

23. A microwave amplifier comprising, a microwave resonant gas confined in a hollow wave energy structure at low pressure, said gas normally presenting positive attenuation to electrical energy at frequencies at which said gas is resonant, pulse generator means for successively applying microwave excitation pulses to separate electrodes in said hollow structure at a resonance frequency of said gas to successively excite groups of molecules adjacent said electrodes whereby at any instant of time at least one of said groups of molecules presents negative attenuation to microwave energy at said resonance frequency, means for applying microwave input energy to at least the group of molecules instantaneously presenting negative attenuation, and means for deriving from said groups of molecules amplified microwave input energy.

24. A microwave amplifier as claimed in claim 23 wherein said groups of molecules each are located in separate amplifying channels, and switching means for successively coupling said microwave input source to said amplifier channels, said input source being instantaneously coupled only to the amplifier channel containing gas molecules presenting negative attenuation.

25. A microwave amplifier as claimed in claim 23 wherein said groups of gas molecules are located in a common wave transmission path.

26. A microwave amplifier comprising, a cavity resonator containing a microwave resonant gas at low pressure, said gas normally presenting positive attenuation to electrical energy at frequencies for which said gas is resonant, means for producing microwave excitation pulses at a resonance frequency of said gas, means for applying said excitation pulses to said resonator as plane running waves to excite said gas to periodically present negative attenuation to microwave energy at said resonance frequency, means for applying microwave input energy at said resonance frequency to said resonator in intervals during which said gas presents negative attenuation and for coupling amplified microwave energy from said resonator, the electric vectors of said excitation and input energies being at right angles to each other.

27. A microwave amplifier as claimed in claim 26 including means for damping all modes of gas excitation energy except the lowest $TE_{01}$ mode.

28. A microwave amplifier as claimed in claim 26 including means for absorbing said excitation energy after passage through said resonator.

References Cited in the file of this patent

UNITED STATES PATENTS

| | | |
|---|---|---|
| 2,190,131 | Alford | Feb. 13, 1940 |
| 2,436,828 | Ring | Mar. 2, 1948 |
| 2,457,673 | Hershberger | Dec. 28, 1948 |
| 2,524,290 | Hershberger | Oct. 3, 1950 |
| 2,591,258 | Hershberger | Apr. 1, 1952 |
| 2,702,371 | Sunstein | Feb. 15, 1955 |